United States Patent [19]
Barker et al.

[11] Patent Number: 5,745,376
[45] Date of Patent: Apr. 28, 1998

[54] METHOD OF DETECTING EXCESSIVE KEYBOARD FORCE

[75] Inventors: John Howard Barker, Cumming, Ga.; Gennaro Battiloro, Boca Raton, Fla.; Gary Robert McClurg, Louisburg, N.C.; Guy Francis Verrier, Boca Raton, Fla.; Gary Edward Webb, Cumming, Ga.

[73] Assignee: International Business Machines Corporation, Armonk, N.Y.

[21] Appl. No.: 647,097

[22] Filed: May 9, 1996

[51] Int. Cl.$^6$ .................................................. G01L 1/10
[52] U.S. Cl. ............................................ 364/508; 73/649
[58] Field of Search ............................... 364/508, 550; 73/649, 763, 768; 434/227, 230; 324/109; 340/665, 669, 407.1, 407.2, 815.4; 341/22

[56] References Cited

U.S. PATENT DOCUMENTS

| | | | |
|---|---|---|---|
| 4,296,406 | 10/1981 | Pearsons | 340/166 R |
| 4,313,113 | 1/1982 | Thornburg | 340/709 |
| 4,323,888 | 4/1982 | Cole | 340/365 A |
| 4,381,502 | 4/1983 | Prame | 340/365 R |
| 4,524,256 | 6/1985 | Miyata et al. | 200/86 R |
| 4,615,252 | 10/1986 | Yamauchi et al. | 84/1.1 |
| 4,649,784 | 3/1987 | Fulks et al. | 84/1.1 |
| 4,651,611 | 3/1987 | Deforeit | 84/1.1 |
| 4,794,366 | 12/1988 | Sakamoto | 338/114 |
| 4,933,807 | 6/1990 | Duncan | 361/283 |
| 5,025,705 | 6/1991 | Raskin | 84/743 |
| 5,053,585 | 10/1991 | Yaniger | 178/18 |
| 5,115,705 | 5/1992 | Monte et al. | 84/617 |
| 5,164,558 | 11/1992 | Huff et al. | 200/83 R |
| 5,184,120 | 2/1993 | Schultz | 340/870.38 |
| 5,184,319 | 2/1993 | Kramer | 364/806 |
| 5,231,380 | 7/1993 | Logan | 340/706 |
| 5,241,308 | 8/1993 | Young | 341/34 |
| 5,244,296 | 9/1993 | Jensen | 400/715 |
| 5,252,971 | 10/1993 | Franz et al. | 341/26 |
| 5,278,557 | 1/1994 | Stokes et al. | 341/34 |
| 5,281,958 | 1/1994 | Ashmun et al. | 345/157 |
| 5,287,089 | 2/1994 | Parsons | 345/156 |
| 5,305,238 | 4/1994 | Starr, III et al. | 364/569 |
| 5,308,917 | 5/1994 | Kitamura et al. | 84/607 |
| 5,309,172 | 5/1994 | Fox | 345/159 |
| 5,339,095 | 8/1994 | Redford | 345/158 |
| 5,341,133 | 8/1994 | Savoy et al. | 341/72 |
| 5,355,148 | 10/1994 | Anderson | 345/166 |
| 5,396,235 | 3/1995 | Maeshima et al. | 341/34 |
| 5,521,596 | 5/1996 | Selker et al. | 341/22 |
| 5,579,238 | 11/1996 | Krugman | 364/508 |

OTHER PUBLICATIONS

"Touch–Pressure Sensitive Frequency–Modulated Keyboard," *IBM Technical Disclosure Bulletin*, vol. 20, No. 10, pp. 4039–4040, Mar. 1978.

Primary Examiner—James P. Trammell
Assistant Examiner—Thomas Peeso
Attorney, Agent, or Firm—Jenkens & Gilchrist; Raymond M. Galasso

[57] ABSTRACT

A method for detecting when a user is typing with excessive force on a keyboard is disclosed. First, the force applied by the user on the keyboard is measured and detected during a first period of time, and the normal level of force applied by the user is determined. Next, the force applied by the user on a keyboard during a second period of time is measured and detected. It is then determined whether the force applied by the user during the second period of time is greater than the normal level of force, and if so, the user is warned and provided with feedback to adjust the level of force being applied to the keyboard.

14 Claims, 2 Drawing Sheets

5,745,376

METHOD OF DETECTING EXCESSIVE KEYBOARD FORCE

FIELD OF THE INVENTION

This invention relates generally to keyboards for inputting data and, more particularly, to computer keyboards. This invention further relates to methods for detecting when a user is typing with excessive force on a keyboard.

BACKGROUND OF THE INVENTION

Computer keyboards are typically used to enter operator data by transforming operator depressions on an X-Y matrix of momentarily depressed key switches into data codes that are then inputted to the system unit of a computer. The standard QWERTY keyboard was developed for use with mechanical typewriters utilizing mechanical linkages. In an effort to prevent jamming of the keys, the QWERTY keyboard matrix was designed to slow the operator down. Keys with high frequency usage were distributed over the keyboard, forcing the typist to pace his keystrokes. The result in operation was a controlled, consistent depression of keys. The physical placement of the keys was designed around the physical geometry and limitations of the mechanical equipment, not the human user. The human user of current computer data entry keyboards is presented the same QWERTY matrix as found on early typewriters. While modem keyboard designs are beginning to investigate alternative matrix layouts, one of the fundamental problems with keyboards is the manner in which they require the human user to apply physical pressure in a machine-oriented manner.

Recent studies indicate that data processing personnel can develop injuries from their job. Such injuries include tendinitis, muscle pulls, back injuries, eye strain, and carpal tunnel syndrome. These injuries are broadly classified as repetitive stress injuries or RSI. Although a clear correlation between keyboard usage and repetitive stress injury has not been determined, various devices and methods have been employed to combat RSI. For example, manufacturers of computer products have designed ergonomic keyboards with special key contours and arrangements to facilitate natural movement and extension of a user's hands and forearms.

Supports designed to lie adjacent to the keyboard to promote proper hand placement have been utilized. U.S. Pat. No. 5,244,296 provides an example of one such support. In U.S. Pat. No. 5,305,238, issued to Starr III et al., a data input monitor is disclosed which counts the number of keystrokes entered on a computer keyboard and computes an actual input rate that data is entered into the computer. The actual input rate is then compared to a stored predetermined input rate to inform a user when to work and when to rest.

Although each of these improvements have been effective in reducing repetitive stress injuries, research indicates that human physiology differs widely over a broad spectrum of people. A particular movement or angle within a work environment may cause a repetitive stress injury to one user but not to another. There are many factors which may cause repetitive stress injury, some of which are a particular movement or angle within a work environment, the amount of data being entered, or the force being used to enter data. What is needed is a method of measuring force a user uses on a keyboard and a method of detecting when a user is typing with excessive force on a keyboard.

SUMMARY OF THE INVENTION

The present invention is directed to a method of detecting when a user is typing with excessive force on a keyboard. The method comprises detecting the force applied by the user on the keyboard during a first period of time and determining a normal level of force applied by the user, detecting the force applied by the user on the keyboard during a second period of time, determining if the force applied by the user during the second period of time is greater than the normal level of force, and indicating to the user that force greater than the normal force is being applied to the keyboard.

The present invention is directed also to a method of detecting when a user is typing with excessive force on each key of a keyboard and indicating to the user which key the user applied a force greater than the normal force.

One advantage of the present invention is that it provides instant feedback to a user so that the user can control the force used to input data into a keyboard.

Another advantage of the present invention is to provide a user the means to control one factor causing repetitive stress injuries (RSI).

DETAILED DESCRIPTION OF A PREFERRED EMBODIMENT OF INVENTION

Generally, the present invention provides a method and system for monitoring keyboard pressure and providing operator feedback of relative key force. The present invention allows a user to both monitor and subsequently control the amount of pressure that is being applied to the keys of a keyboard.

Figure 1:
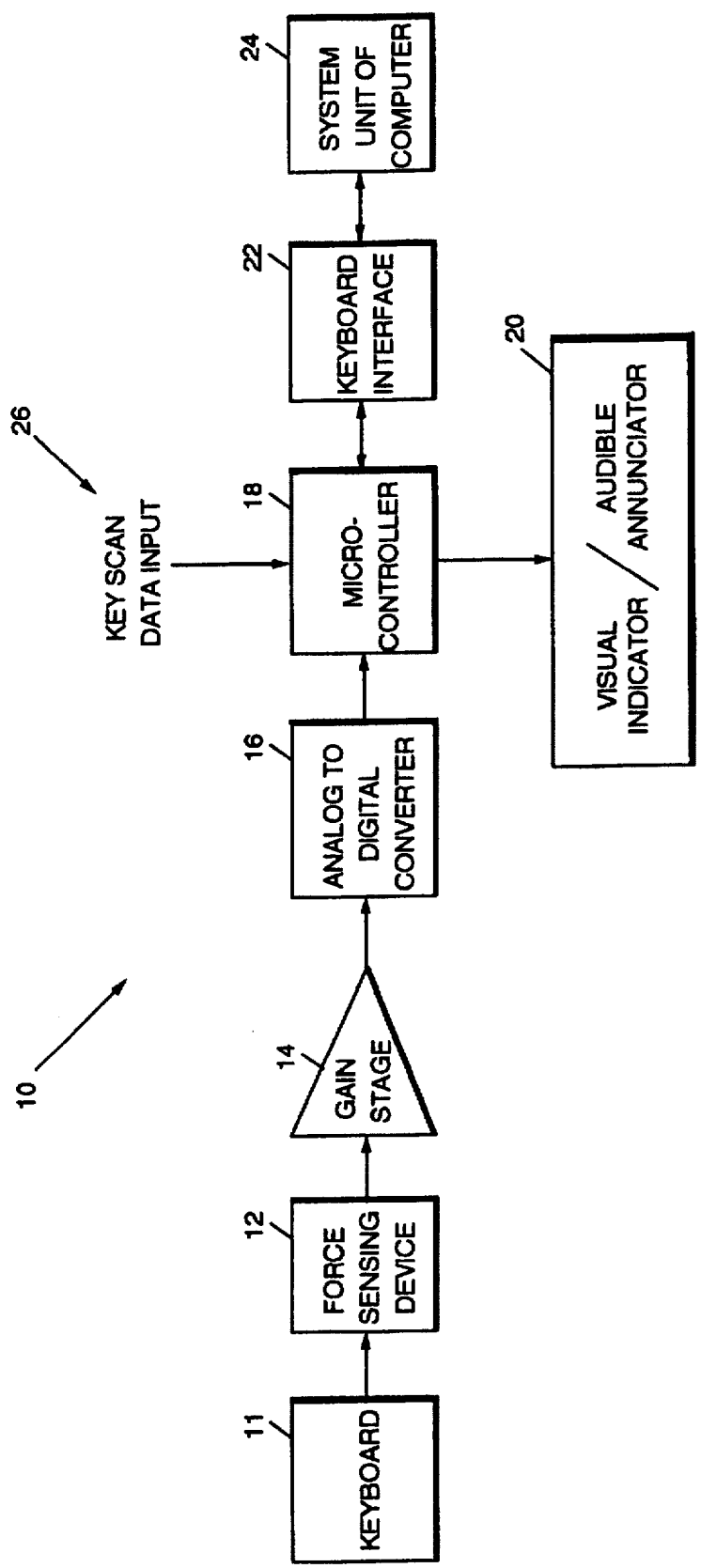
FIG. 1 illustrates a schematic block diagram of a keyboard force monitoring and feedback system used to implement the method of the present invention.

FIG. 1 illustrates a keyboard force monitoring and feedback system which may be used to implement the method of the present invention. System 10 includes a keyboard 11, a force sensing device 12, a gain stage 14, an analog to digital converter (ADC) 16, a microcontroller 18, a visual indicator/audible annunciator device 20, a keyboard interface 22, and a system unit 24 of a computer. Keyboard 11 may be any data input device which requires a user to press a key or button to input data to a computer or other data processing equipment. Preferably, keyboard 11 is a computer keyboard having an X-Y matrix of momentarily depressed key switches having a conventional QWERTY configuration. Force sensing device 12 senses the pressure/force exerted on a keyboard 11 key and/or the entire keyboard 11 and converts the pressure into an analog voltage.

Force sensing device 12 may be employed using piezo and foil strained gauges, optical, magnetic and capacitive technologies. In the preferred embodiment, force sensing device 12 comprises a force sensing resistor, wherein the resistance of the force sensing resistor changes as a function of pressure load placed on it, and a power supply coupled to the force sensing resistor. Gain stage 14 amplifies the analog signal received from force sensing device 12. ADC 16 converts the amplified analog signal received from the output of the gain stage 14 and converts it into a digital signal representing the pressure. Microcontroller 18 receives the digital signal from ADC 16 and compares the digital representation of the pressure to a threshold value stored within the microcontroller 18. The threshold value is a predefined value representing the normal force, i.e., not excessive, exerted by a user on a keyboard 11 key or the entire keyboard 11.

If the pressure value is greater than the stored threshold, microcontroller 18 produces a control signal which is sent to the visual indicator/audio annunciator device 20 to provide a user with a visual indication and/or audible warning that the user has exerted a force on keyboard 11 greater than the normal force, i.e., an excessive force.

Microcontroller 18 is coupled to keyboard interface 22. Keyboard interface 22 couples microcontroller 18 to system unit 24 of a computer for transmittal of data to/from microcontroller 18 to/from system unit 24. In this manner, keyboard 11 key or keyboard 11 pressure values can be transmitted to the system unit 24 of a computer for display or audio playback on a computer peripheral unit such as a printer, a computer monitor, or a computer speaker. Also, a user may adjust the threshold value or normal force stored within microcontroller 18 via the communication link between system unit 24 and microcontroller 18.

Microcontroller 18 also receives a key scan data input signal 26 prompting the microcontroller 18 to send a unique stored data code to system unit 24 based upon the key or keys pressed by the user on keyboard 11. In this manner, system 10 may be used to correlate pressure values with the actual key or keys depressed.

One or more force sensing devices 12 may be employed to measure force being applied to one or more keys of the keyboard 11 or the entire keyboard 11. Force sensing device 12, gain stage 14, ADC 16, microcontroller 18, and keyboard interface 22 may be housed within the keyboard 11. Preferably, visual indicator/audio annunciator device 20 is housed within or attached to keyboard 11. Visual indicator/audio annunciator device 20 may be a stand-alone unit or stand-alone units or may be the computer monitor and speaker operably coupled to the computer utilizing system unit 24. System 10 is non-intrusive to the normal operation of keyboard 11, i.e., all keys may be used in their traditional implementation.

Figure 2:
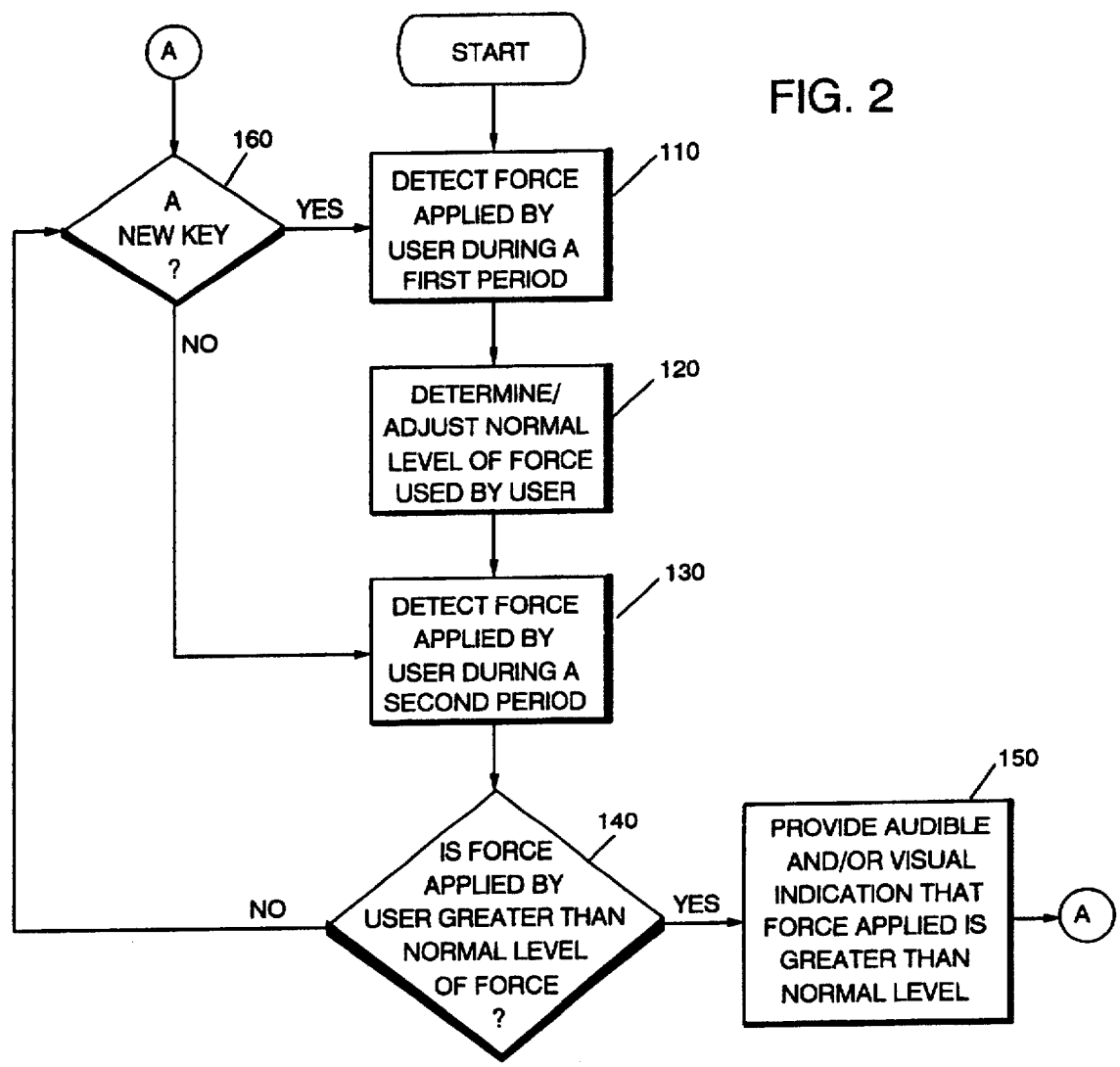
FIG. 2 illustrates a logic diagram illustrating a method of detecting excessive keyboard force in accordance with the present invention.

FIG. 2 illustrates a method which utilizes the previously described system 10 to detect when a user is typing with excessive force on a keyboard in accordance with the present invention. At step 110, the process detects or measures the force applied by the user on the keyboard during a first period of time. The process then proceeds to step 120 where the normal level of force applied by the user is determined from the measured force value detected in step 110. The process then proceeds to step 130 where the force applied by the user during a second period of time is detected and measured.

The process then proceeds to step 140 where it is determined whether the force applied by the user during the second period of time is greater than the normal level of force. If the force applied by the user during the second period of time is greater than the normal level of force, then the process proceeds to step 150 where an audible and/or visual indication, warning the user that the force applied is greater than the normal level, is provided. Audible indication may be an audible alarm, a voice message playback or the like. If the force applied by the user during the second period of time is not greater than the normal level of force, then the process proceeds to step 160.

After step 150 is complete, the process proceeds to step 160. In step 160, it is determined whether a new key has been depressed by the user. If a new key has been pressed by the user, then the process returns to step 110 to repeat the process of determining a normal level of force for the new key. If a new key has not been pressed, i.e., a key that has already been pressed has been pressed again, the process returns to step 130 to repeat the process of determining if an excessive force has been applied. Steps 110, 120, 130, 140, and 150 may be repeated for each key of the keyboard.

Step 150 may additionally comprise the step of indicating to the user that force greater than the normal force is being applied to the keyboard when force greater than the normal force is applied to a predetermined number of keys during a predetermined period of time. Thus, the process may be used to indicate to a user when a user is applying excessive force to an individual key or to any number of keys collectively as a group.

Step 150 may also comprise the step of indicating to which key the user applied a force greater than the normal force. Step 120 may further comprise the step of adjusting the normal level of force applied by the user. In this manner, the normal level of force may be adjusted for a new user or to increase or decrease sensitivity.

Although the present invention and its advantages have been described in detail, it should be understood that various changes, substitutions and alterations can be made herein without departing from the spirit and scope of the invention as defined by the appended claims.

What is claimed is:

1. A method of detecting when a user is typing with excessive force on a keyboard, said method comprising the steps of:

detecting the force applied by the user to each key of the keyboard during a first period of time;

determining from said detecting step a normal level of force applied by the user for each key during said first period of time;

detecting the force applied by the user to a key of the keyboard during a second period of time;

determining if the force applied by the user to said key during said second period of time is greater than the normal level of force for said key; and indicating to the user that force greater than the normal force is being applied to said key of the keyboard.

2. A method as recited in claim 1, wherein said step of determining if the force applied by the user is greater than the normal force applied by the user comprises the step of determining if the force applied by the user is greater than the normal force applied to that key of the keyboard.

3. A method as recited in claim 2, wherein said step of indicating to the user that force greater than the normal force is being applied to the keyboard comprises the step of indicating to the user that force greater than the normal force is being applied to the keyboard when force greater than the normal force is applied to a predetermined number of keys during a predetermined period of time.

4. A method as recited in claim 2, wherein said step of indicating to the user that force greater than the normal force is being applied to the keyboard comprises the step of indicating to the user that force greater than the normal force is being applied to the keyboard when force greater than normal force is applied to an individual key.

5. A method as recited in claim 4, wherein said step of indicating to the user that force greater than the normal force is being applied to the keyboard comprises the step of indicating to which key the user applied a force greater than the normal force.

6. A method as recited in claim 4, wherein said step of indicating to the user that force greater than the normal force is being applied to the keyboard comprises the step of providing an audible alarm to the user.

7. A method as recited in claim 6, wherein said step of indicating to the user that force greater than the normal force is being applied to the keyboard comprises the step of indicating to which key the user applied a force greater than normal force.

8. A method as recited in claim 1, wherein said step of indicating to the user that force greater than the normal force is being applied the keyboard comprises the step of indicating to the user that force greater than the normal force is being applied to the keyboard when force greater than the normal force is applied to a predetermined number of keys during a predetermined period of time.

9. A method as recited in claim 8, wherein said step of indicating to the user that force greater than the normal force is being applied to the keyboard comprises the step of indicating to which keys the user applied a force greater than the normal force.

10. A method as recited in claim 8, wherein said step of indicating to the user that force greater than the normal force is being applied to the keyboard comprises the step of providing an audible alarm to the user.

11. A method as recited in claim 10, wherein said step of indicating to the user that force greater than the normal force is being applied to the keyboard comprises the step of indicating to which key the user applied a force greater than the normal force.

12. A method as recited in claim 1, wherein said step of indicating to the user that force greater than the normal force is being applied to the keyboard comprises the step of providing an audible alarm to the user.

13. A method as recited in claim 1, wherein said step of indicating to the user that force greater than the normal force is being applied to the keyboard comprises the step of indicating to which key the user applied a force greater than the normal force.

14. A method as recited in claim 1, wherein said step of determining from said detecting step a normal level of force applied by the user comprises the step of adjusting the normal level of force applied by the user.

* * * * *